May 25, 1926.
T. B. McLEROTH
1,585,904
METHOD OF AND APPARATUS FOR MANUFACTURING MULTICELLULAR AIR TUBES FOR PNEUMATIC TIRES
Filed August 2, 1923
8 Sheets-Sheet 4
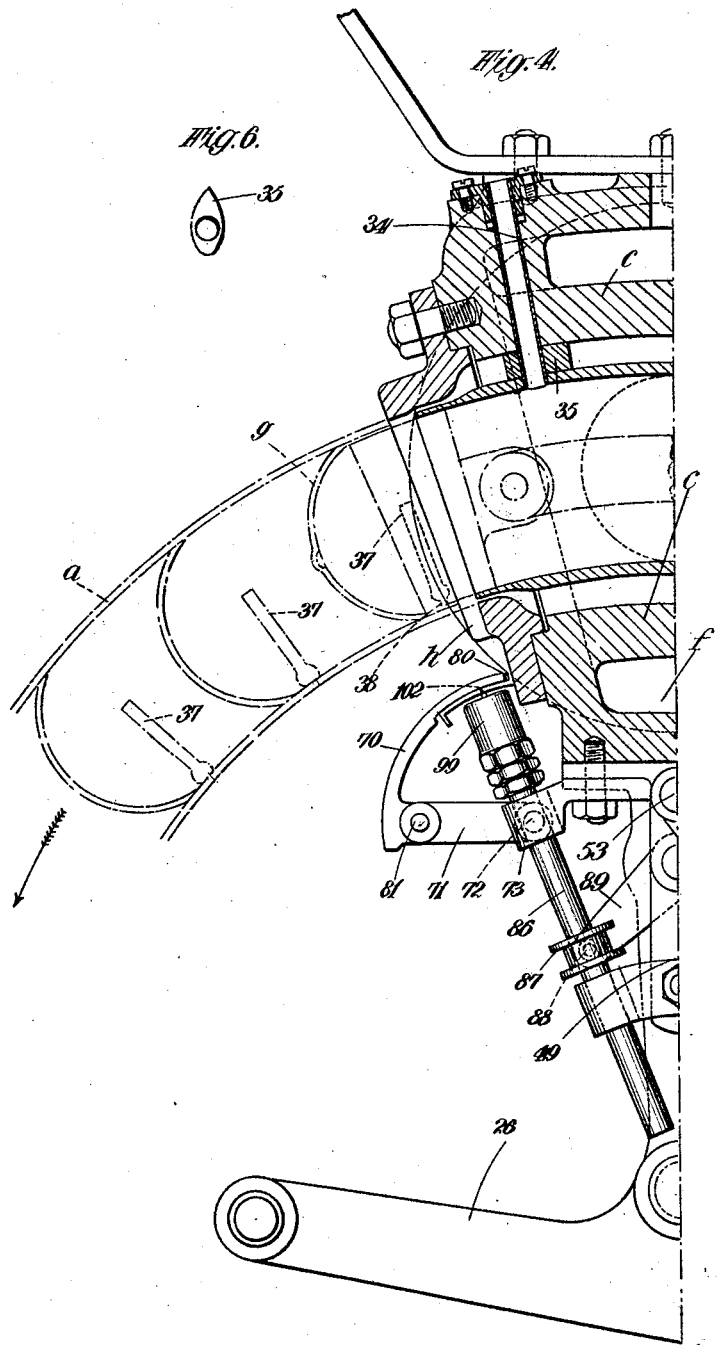
INVENTOR
THOMAS BAKER MC. LEROTH
BY
ATTORNEYS

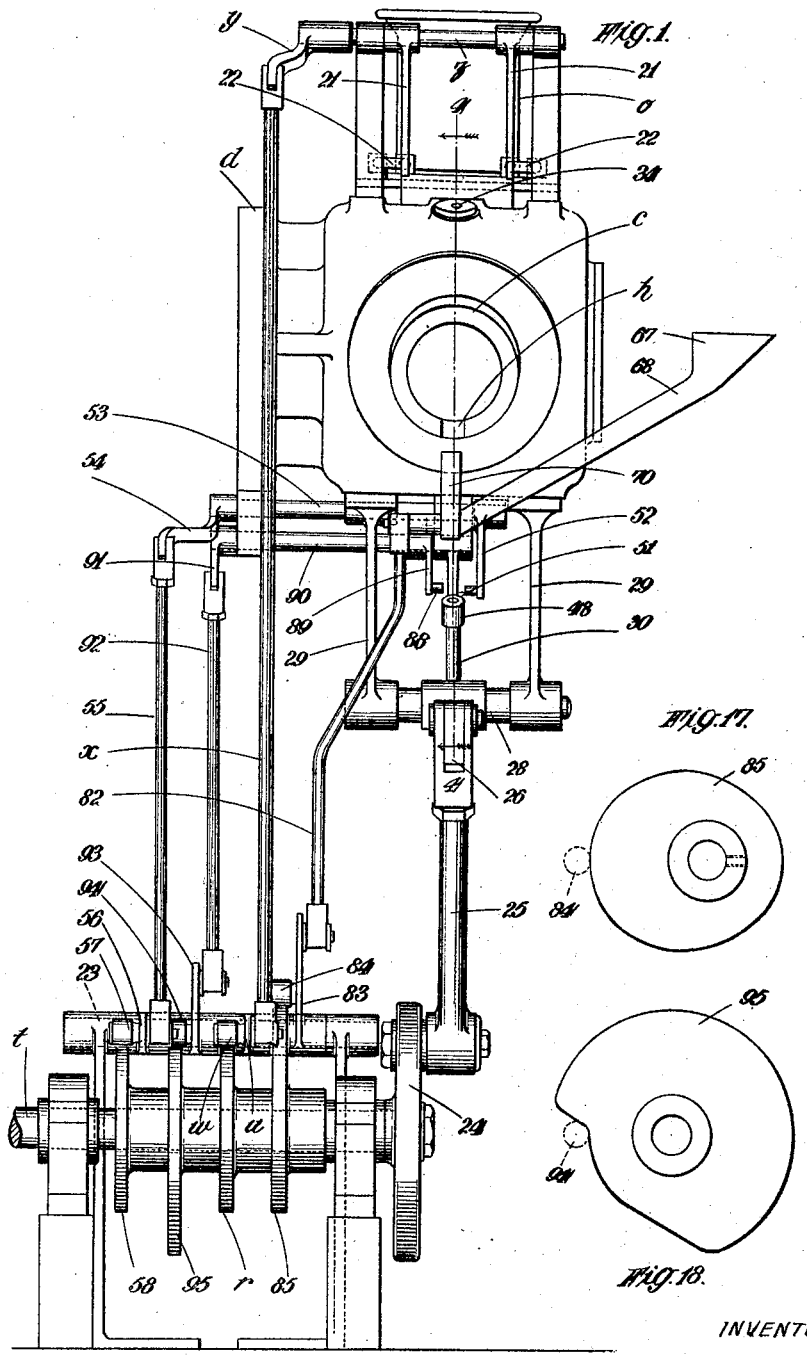

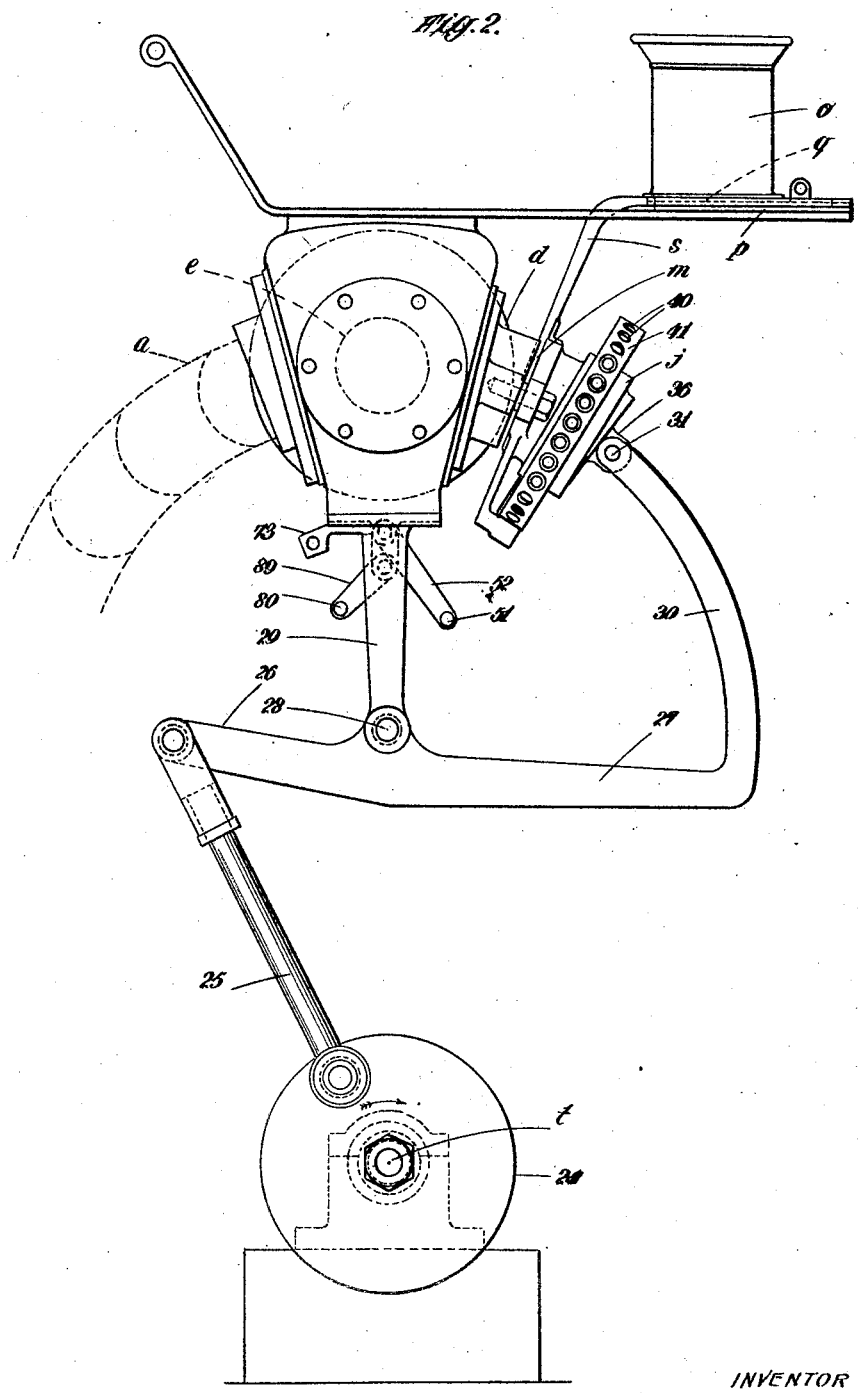

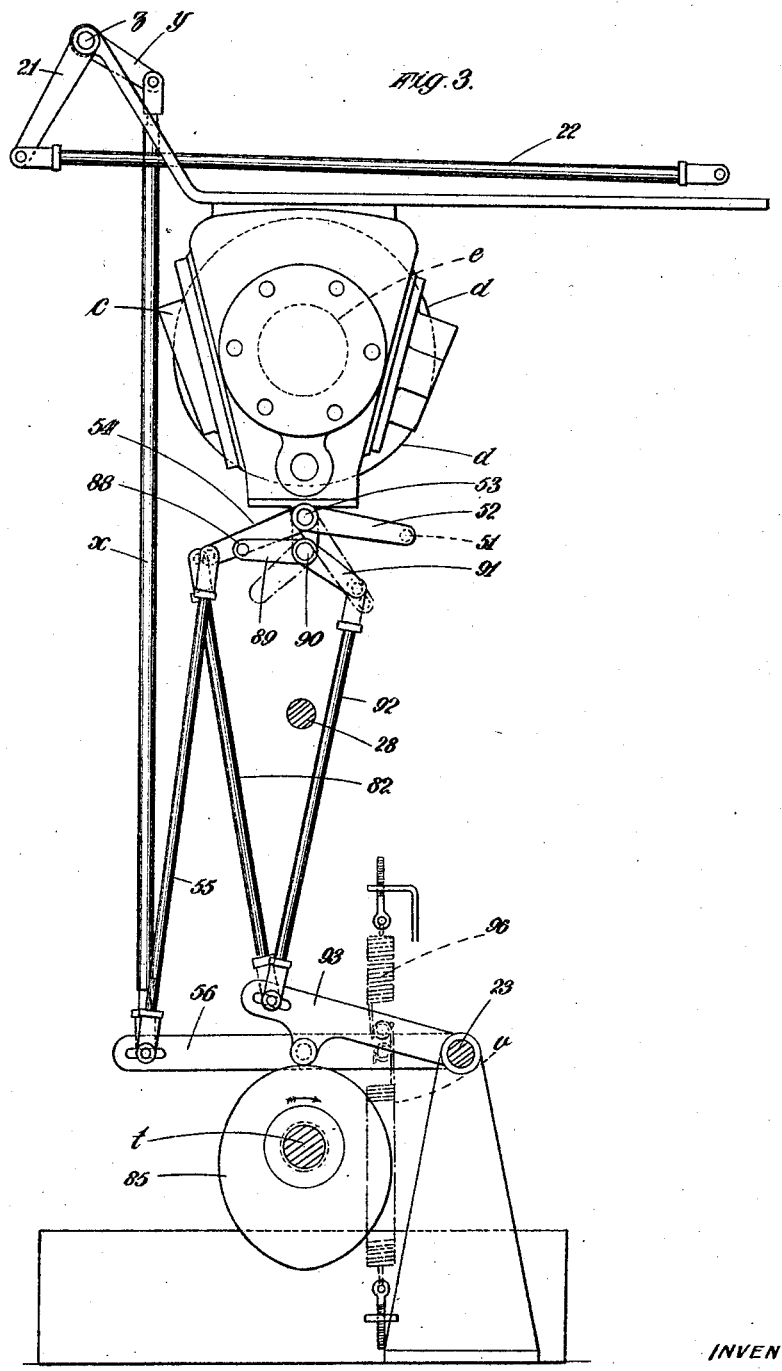

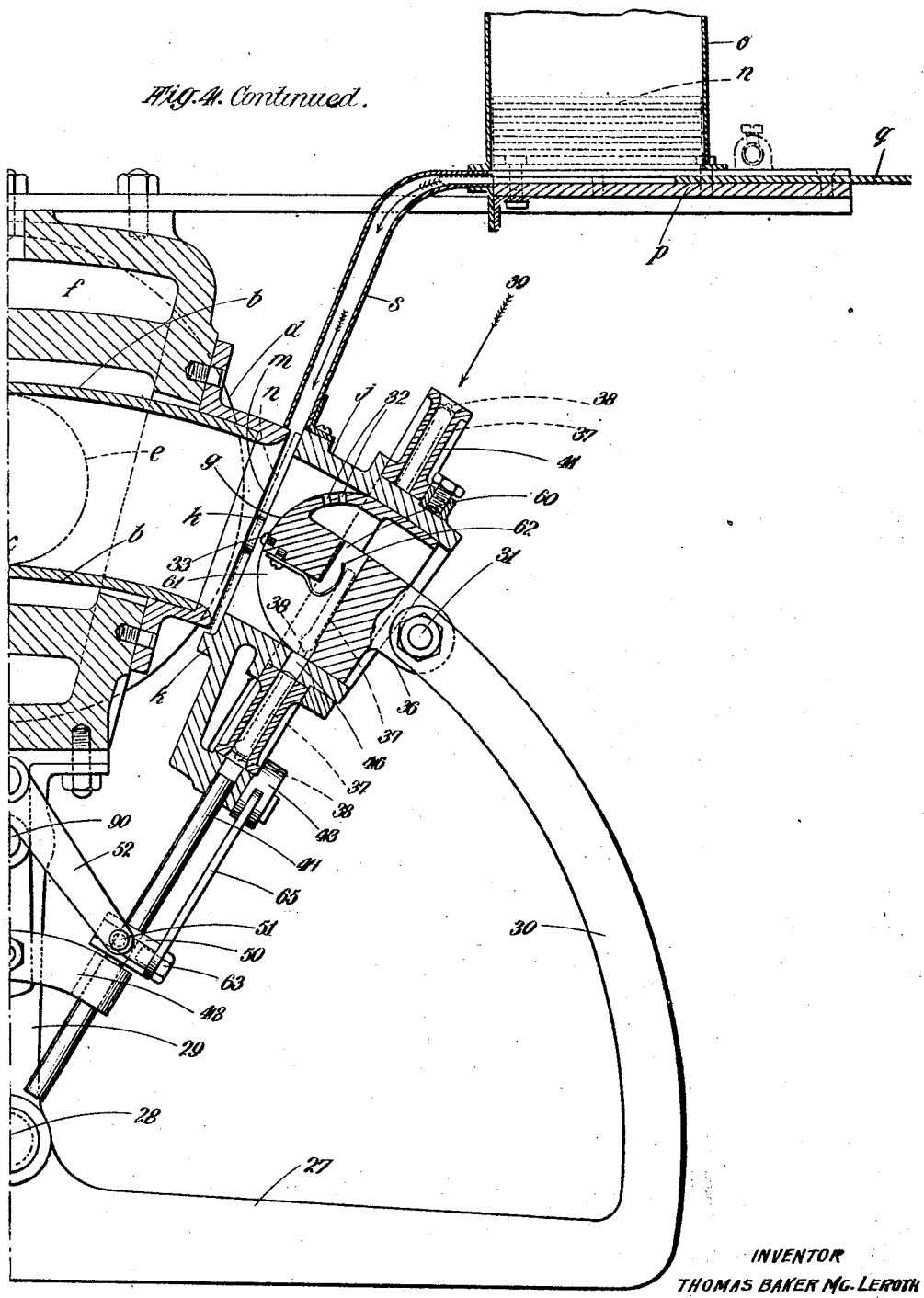

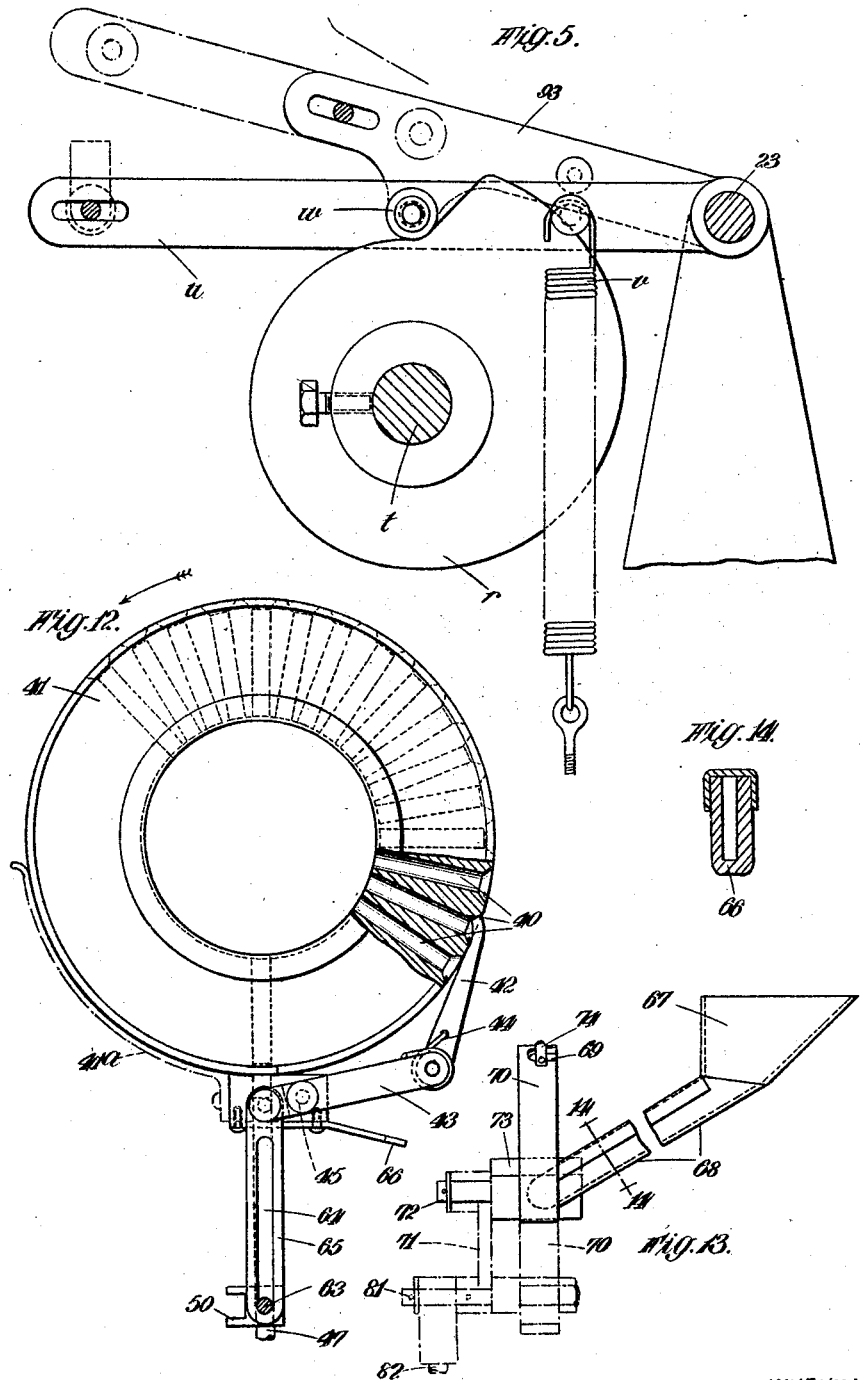

May 25, 1926.
T. B. McLEROTH
1,585,904
METHOD OF AND APPARATUS FOR MANUFACTURING MULTICELLULAR AIR TUBES FOR PNEUMATIC TIRES
Filed August 2, 1923    8 Sheets-Sheet 7
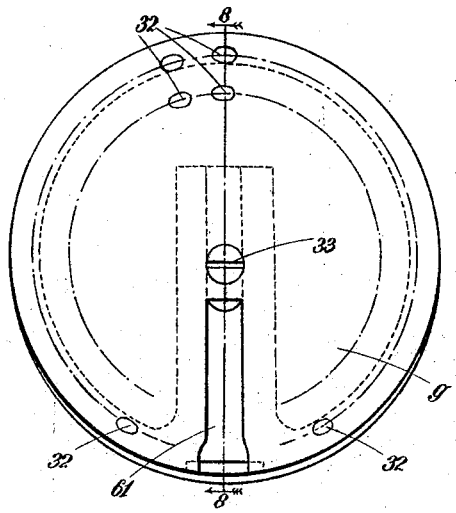
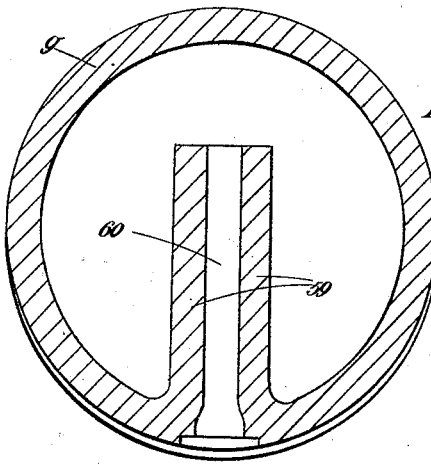
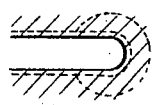
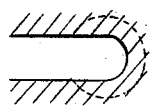
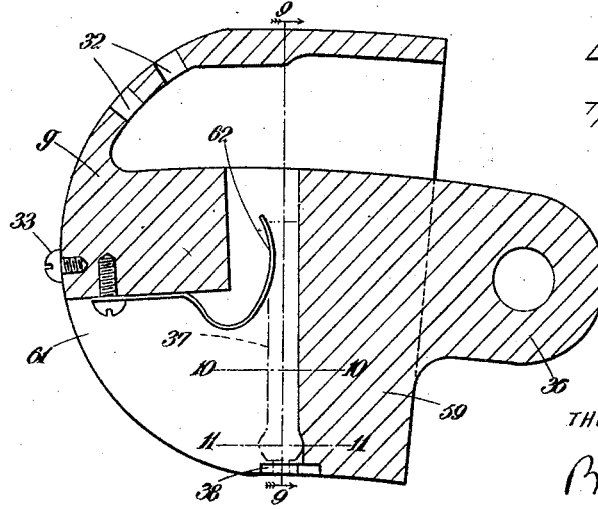
INVENTOR
THOMAS BAKER MC-LEROTH
BY
ATTORNEYS

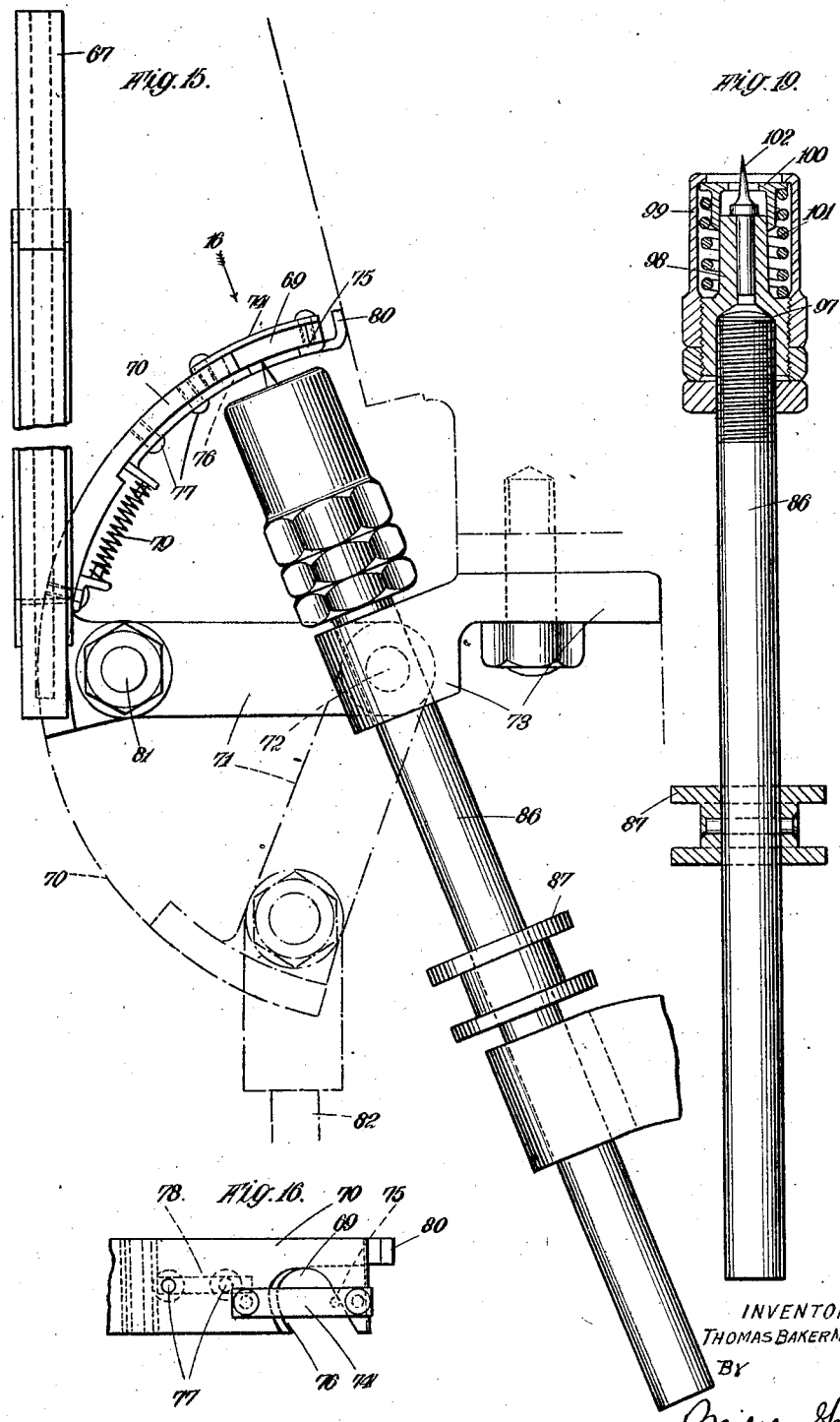

Patented May 25, 1926.

1,585,904

UNITED STATES PATENT OFFICE.

THOMAS BAKER McLEROTH, OF LONDON, ENGLAND, ASSIGNOR TO T. B. McLEROTH (TUBES) LIMITED, OF LONDON, ENGLAND.

METHOD OF AND APPARATUS FOR MANUFACTURING MULTICELLULAR AIR TUBES FOR PNEUMATIC TIRES.

Application filed August 2, 1923. Serial No. 655,228.

This invention relates to multicellular air tubes for pneumatic tires and the manufacture thereof and has for its main object to simplify and expedite the method of manufacture and thus reduce the cost of such articles. To this end and in accordance with this invention a multicellular air tube is manufactured by extrusion of raw rubber through an annular die and the successive forcing into position, axially of the tube being manufactured, of a series of raw rubber discs.

The apparatus for this purpose comprises a die consisting of two co-axial tubes having an annular space therebetween, adapted for the feeding thereinto and therethrough of raw rubber, a plunger adapted to be reciprocated or oscillated in the inner tube, and means for feeding the raw rubber discs to said inner tube in advance of the plunger and in a plane substantially normal to the direction of length of said tube.

The raw rubber may be fed to the die by means of an Archimedean screw rotatable coaxially with the die, the whole being steam jacketed or otherwise heated to maintain the rubber in a plastic condition, preferably, however, the apparatus is designed to be attached to any convenient standard form of rubber, forcing or spueing machine from which the rubber is forced, e. g., radially, into the annular space between the two tubes constituting the die, and if such standard form of machine includes an Archimedean screw the latter may be suitably lengthened.

Preferably, the inner tube of the die is shorter than the outer tube so that, when at the end of its stroke the plunger pushes a raw rubber disc out of the inner tube, the periphery of said disc will make contact and join with the inner periphery of the extruded tube before the latter leaves the outer tube and is free to expand.

Alternatively, in order to prevent such expansion of the extruded tube as soon as it leaves the outer tube of the die from impairing the adhesion of the periphery of the raw rubber disc to the inner periphery of the extruded tube, a contractible ring or sleeve may be provided just beyond the end of the die so that at the end of the stroke of the plunger said ring may be contracted by cam or like operated means to squeeze the extruded tube against the periphery of the raw rubber disc.

In order that the extruded tube may be curved, in the direction of its length, to correspond with the circumference of the finished air tube, those parts of the two tubes between which the annular space is formed are arcuate axially. Further, as it desirable that the diaphragms which sub-divide the air tube and which are constituted by the rubber discs, should not be under tension when the finished air tube is inflated said discs should be made of a greater diameter than the internal diameter of the inner tube of the die and the working face of the plunger should be ovoid or spherical. In order that such enlarged discs may be fed to the cylinder in which the plunger works, i. e., within the inner tube of the die, said cylinder may be formed with a peripheral enlargement or groove which may taper towards that end of the die from which the air tube is to be extruded and a feed slot is formed in one side of said peripheral enlargement or groove, the discs being fed through said slot in succession by any convenient means. It is to be understood that after the requisite length of air tube has been extruded with diaphragm spaced therein, said length is cut off, its ends joined and the air tube vulcanized in any known manner.

More particularly stated the invention relates to an air tube for a pneumatic tire such as is described in the specification of my prior Letters Patent No. 1,459,544. Such an air-tube is sub-divided by a plurality of diaphragms into sections or compartments and has an inflating channel, called the common feed passage, running around its inner periphery and communicating with each section or compartment, this communication being by way of a valveless rubber feed tube projecting into such section or compartment and adapted, on a section or compartment being punctured, to be squeezed between the diaphragms, which constitute the end walls of said section or compartment and which belly out towards one another as a result of the puncturing of said section or compartment, and to be bent over by them and thereby close the communication between such section or compartment and the common feed passage.

It therefore becomes necessary to introduce into each section or compartment of an air tube manufactured in accordance with this invention, the valveless rubber feed tube above mentioned and to this end the annular space between the two coaxial tubes of the die may be traversed by a short tube or passage extending substantially radially of the die and serving to admit the valveless rubber feed tube and the means by which it is introduced, said short tube or passage being so situated, and the means for introducing the valveless rubber feed tube being so directed, that the end of said feed tube may be brought into contact with the inner surface of that part of the extruded air tube which has passed beyond the end of the inner tube of the die but not beyond the end of the outer tube of the die.

In order to ensure reunion of the raw rubber (which is forced through the die) after it has flowed past the traversing tube above mentioned, a screen of fine wire gauze may be introduced into the annular space between said traversing tube and the end of the die, to split up the raw rubber into a large number of fine threads which, as the rubber is forced through the constricted orifice of the die, unite together more readily than would the edges of the split formed by the flowing of said rubber past the traversing tube.

Preferably, however, the valveless rubber feed tube is not introduced through a tube or passage traversing the annular space between the two coaxial tubes of the die, but is carried into position by means of the plunger.

In the specification of my pending application for Letters Patent Serial No. 623,393 is described and claimed a method of manufacturing air tubes such as are claimed in my said prior Letters Patent No. 1,459,544, according to which method, inter alia, the air tube and diaphragms are of raw rubber whilst the valveless rubber feed tube is of partially vulcanized rubber, and it is desirable that an air tube made in accordance with the present invention should be built up in a similar manner. Further, in the specification of my pending application for Letters Patent Serial No. 573,238 are described various forms of a so-called "stud" which may be introduced into a valveless rubber feed tube and which stud is formed with a fine, substantially axial passage communicating with a passage or passages arranged transversely of the base of the stud and debouching at the periphery thereof. An improved form of stud is described and claimed in the specification accompanying my pending application for Letters Patent Serial No. 617,930, according to which the stud is constituted by two main portions, one, with a substantially axial passage therethrough and comprising a head and neck, and the other, a base formed with a passage or passages arranged transversely thereof so as to communicate with the passage through the other portion and so as to debouch at or near the periphery of said base portion, said base portion being adapted to be secured to the neck of the other portion.

In an air tube made in accordance with the present invention, it is desirable to employ not only partially vulcanized valveless rubber feed tubes as above set forth but also studs of the improved form just mentioned and for the production of such an air tube the partially vulcanized valveless rubber feed tubes must be introduced into the air tube each with the head portion of a stud previously arranged therein, the air tube being afterwards punctured to give passage to the neck of said head portion and the base portion of the stud being afterwards applied and secured to said neck portion.

In the improved air tube, therefore, the partially vulcanized valveless rubber feed tubes are secured to the wall of the air tube itself by means of the studs, instead of being secured to an independent strip or patch which is then applied to the air tube.

After the requisite length of air tube has been made its ends are joined and a strip of raw rubber is solutioned or otherwise secured by its edges to the inner periphery of said air tube so as to cover the bases of the studs and constitute the common feed passage, after which the tube may be vulcanized.

For the manufacture of such an air tube the apparatus comprises not only the die and feeding means aforesaid, including the means by which the valveless rubber feed tube is introduced into the air tube, but also means for feeding to said introducing means, in succession, valveless rubber feed tubes each with the head portion of a stud previously arranged therein, means for transferring said tubes individually from their feeding means to their introducing means, means for feeding into position, in succession, the bases of the studs, means for puncturing the air tube to give passage to the necks of the head portions of the successive studs, means for placing said bases individually upon said necks and for securing them thereto and means for coordinating the several feeding introducing and other operative portions of the complete apparatus.

One form of apparatus constructed in accordance with this invention is illustrated by the accompanying drawings wherein Figure 1 is an end elevation of part of the apparatus, Figures 2 and 3 are side elevations as seen from the right of Figure 1, different parts being omitted for the sake of clearness, Figure 4 is an enlarged sectional elevation of part of the apparatus, mainly on the line 4—4, Figure 1, Figure 5 is an enlarged elevation of a detail, Figure 6 is a plan of a detail on the same scale as Figure 4, Figure 7 is an end view, Figure 8 a section on the line 8—8, Figure 7, and Figure 9 a section on the line 9—9, Figure 8, of the plunger, on a still larger scale, whilst Figures 10 and 11 are fragmentary sections on the lines 10—10 and 11—11 respectively, Figure 8, Figure 12 is a sectional elevation of a detail and Figure 13 is an elevation of another detail both on the same scale as Figure 4, Figure 14 is an enlarged section on the line 14—14, Figure 13, Figure 15 is an enlarged elevation of a detail, Figure 16 is a fragmentary face view in the direction of the arrow 16, Figure 15, Figures 17 and 18 are side views of two cams and Figure 19 is a sectional elevation of a detail on an enlarged scale.

With the apparatus illustrated, the air tube indicated at $a$ in dotted lines, Figures 2 and 4 is extruded from a die consisting of two co-axial tubes $b$ and $c$ the axis of which is curved to conform with the circumferential curvature of the finished air tube. The outer tube $c$ of the die is formed with a flange $d$, Figure 1, whereby it may be attached to the outlet of any convenient standard form of rubber forcing or spueing machine, not shown, in order that rubber may be forced through the inlet $e$, Figure 4, radially into the annular space between the two tubes $b$ and $c$, and is steam jacketed as at $f$, whilst the inner tube $b$ of the die constitutes a toroidal cylinder of limited arcuate length for a plunger $g$ referred to hereinafter. At the outlet end of the die the outer tube $c$ projects beyond the end of the inner tube $b$ and at the underside of this projecting end of the outer tube $c$ a small gap is provided at $h$ to enable the base portion of a stud to be applied and secured to the neck of the head portion as hereinafter set forth.

Adjacent that end of the die $b$, $c$ remote from its outlet is arranged a hollow bracket $j$, the interior of which has the same diameter as that of the inner tube $b$ of the die and constitutes a continuation of the toroidal cylinder for the plunger $g$. The bracket $j$ is spaced from the adjacent end of the die $b$, $c$ and furnished at and below the level of its axis with lugs such as $k$ so that a slot $m$ is formed in the upper half of the periphery of the toroidal cylinder adjacent the lugs $k$ . . . for the admission of discs of raw rubber indicated in dotted lines at $n$, Figure 4, the diameter of each of which is greater than that of the toroidal cylinder. Above the level of the toroidal cylinder are disposed means for feeding such discs $n$ . . . in succession to said slot $m$. For this purpose discs $n$ . . . are placed horizontally and one above another in a vertical guide or hopper $o$, the bottom of which is spaced above a table $p$ a distance slightly greater than the thickness of each disc $n$, and on this table is reciprocated a flat plunger $q$ driven by a cam $r$ as hereinafter explained so as to push away that disc $n$ which for the time being is at the bottom of the hopper $o$ thus feeding the discs $n$ . . . in succession from said hopper, each disc $n$ as it is so pushed sliding through a downwardly inclined chute $s$ so that it enters the slot $m$ leading to the toroidal cylinder and on passing through said slot extends across the cylinder like a diaphragm.

The cam $r$ is mounted on a shaft $t$ driven by any convenient means, not shown, from a rotating part of the rubber forcing or spueing machine, (also not shown) and said cam, which is of snail form as shown in Figure 5, acts upon a rocking arm $u$ against the action of a string $v$ through an anti-friction roller $w$ carried by said arm. The rocking arm $u$ is connected by means of a rod $x$ with a lever $y$ on a lay-shaft $z$ on which are mounted two levers 21, 21 which in turn are connected by means of two rods 22, 22 with the flat plunger $q$, the rods 22, 22 being cranked outwards so as to pass on either side of the hopper $o$. This arrangement is such that as the shaft $t$ and cam $r$ are rotated the latter gradually raises the rocking arm $u$ about its pivot 23 against the action of the spring $v$, raises the rod $x$, turns the lay-shaft $z$ about its axis through the lever $y$, carries the levers 21, 21 the rods 22, 22 and the flat plunger $q$, to the right, Figure 3, until a disc $n$ falls on to the table $p$ just when the maximum radius of the cam $r$ is acting on the rocking arm $u$ and as soon as said maximum radius passes the anti-friction roller $w$, the latter drops suddenly together with the arm $u$ towards the shaft $t$ thus causing the flat plunger $q$ to be moved forward rapidly to push forward a disc $n$ to the chute $s$ as above set forth, said disc dropping down the chute $s$ by gravity.

The plunger $g$ working in the toroidal cylinder is driven from the shaft $t$ by means of a crank disc 24 on said shaft, a connecting rod 25 uniting the crank disc 24 with one arm 26 of a lever 26, 27 pivoted by means of a shaft 28 between a pair of hanging brackets 29, 29 suspended from the outer tube $c$ of the die, the other arm 27 of the lever 26, 27 being formed with an arcuate extension 30 to the end of which the plunger $g$ is secured at 31, said arcuate extension 30 being of such length as to enable the plunger $g$ to be carried through the arcuate length of the toroidal cylinder to the position indicated in dotted lines in Figure 4. The head of the plunger $g$ is perforated as at 32 or otherwise suitably reticulated so as to prevent the formation of air pockets between its surface and the disc $n$ of rubber to be fed, and it is provided with a round headed screw or like projection 33 adapted to impinge against the centre of the disc $n$ to be fed to centralize it and prevent it from slipping sideways. Towards the outlet end of the die a short passage 34, Figure 4, is arranged substantially radially of the die to permit the ingress and egress of air from the toroidal cylinder as the plunger $g$ moves backwards and forwards. Where the passage 34 traverses the annular space between the two tubes $b$ and $c$ it is surrounded by a streamlined boss 35, Figures 4 and 6, so that as the raw rubber is forced through said annular space it flows around the boss 35 and unites at the far side thereof. If desired a screen of fine wire gauze may be introduced into said annular space between the boss 35 and the outlet end of the die so as to split up the raw rubber into a large number of fine threads, which, as the rubber is forced through the constricted outlet of the die, may be found to unite together more rapidly than would the edges of the split formed by the flowing of said rubber past the boss 35. In shape the plunger head $g$ is partly toroidal and partly the minor segment of a sphere as shown in Figures 4 and 8 and is formed with a rearwardly projecting lug 36 for connection with the extension 30 at 31. The stroke of the plunger $g$ must be sufficient to carry its head from the position shown in full lines in Figure 4 in rear of a disc $n$ in the space between the toroidal cylinder and the bracket $j$ to a position shown in dotted lines in Figure 4 beyond the end of the inner tube $b$ of the die, in which latter position the periphery of the disc $n$ which is thus forced through the toroidal cylinder, comes into contact with the inner surface of the air tube $a$ which is being extruded from the die. As the outer tube $c$ of the die is steam jacketed as at $f$ or otherwise heated the circumferential portion of the raw rubber disc as the latter is pressed forward by the plunger is more highly heated than its central portion, with the result that when the periphery of said circumferential portion comes into contact with the similarly heated inner wall of the air tube $a$ when the plunger $g$ forces the raw rubber disc beyond the end of the inner tube $b$ of the die, the rubber of said circumferential portion and of the air tube $a$ are in such condition as to unite. The plunger $g$ is then retracted and another raw rubber disc $n$ is fed into position to be advanced through the die into the air tube $a$ so as to constitute the succeeding diaphragm of the latter, and so on, the reciprocations of the plunger $g$ being such relatively to the length of air tube $a$ extruded through the die in a given time that the diaphragms in the air tube $a$ are spaced apart the requisite circumferential distance in said air tube. Means are provided for introducing, in succession, into the air tube $a$ and between successive diaphragms the partially vulcanized valveless rubber feed tubes, and cooperating with these introducing means are provided means for feeding, in succession, to said introducing means the feed tubes to be introduced into the air tube. Partially vulcanized valveless rubber feed tubes, indicated in dotted lines at 37 in Figures 4 and 8 each of the required length, and into one end of each of which has previously been placed by hand the head of a stud such as is described in the specification accompanying my pending application for Letters Patent Serial No. 617,930, referred to above, the neck of such a stud also being indicated in dotted lines at 38 in Figures 4 and 8, are fed by hand as indicated by the arrow 39, Figure 4, each with the stud end outwards, into one of a series of radial chambers 40 in an annular carrier 41 revoluble about a bearing formed on the bracket $j$ the friction between the walls of said chambers 40 and those parts of the feed tubes 37 which are expanded by the heads of the studs being sufficient to retain said tubes in said chambers as the carrier 41 is revolved, but if desired a fixed peripheral guard plate may be provided as indicated at $41^a$ in dotted lines, Figure 12. The carrier 41 is adapted to be revolved by means of a pawl 42, Figure 12, pivoted on an arm 43 and influenced by a spring 44 so that its free end presses against the periphery of the carrier 41 and is adapted to engage in succession the walls of the chambers 40, (or with teeth formed in said periphery), the arm 43 being rocked about its pivot 45, by means to be explained hereinafter, thus causing the pawl to feed forward the carrier 41, step by step, and causing the chambers 40 to be brought in succession into alignment with an opening 46, Figure 4, in the bracket $j$.

In order that the feed tubes 37 may be transferred, in succession, from the carrier 41 to the plunger $g$ whereby they are introduced into the air-tube $a$, a rod 47 is slidably mounted in bearings in the bracket $j$ and in a bearing quadrant 48 mounted on a bracket 49 which is secured to the outer tube $c$ of the die, the bearing in the bracket $j$ being in alignment with the opening 46. On the rod 47 is a transversely grooved block 50 with which engages a pin 51 on an arm 52 mounted on a shaft 53 carried by bearings in the bracket 49 on which shaft 53 is a second arm 54 connected by a rod 55 with a spring influenced rocking arm 56 (like the rocking arm $u$) an antifriction roller 57 which coacts with a cam 58 (like the cam $r$) on the shaft $t$ so that the rod 47 is gradually retracted as the cam 58 causes the rocking arm 56 to be moved against the action of its spring until just when the maximum radius of said cam passes the antifriction roller 57 the latter drops suddenly and thus causes the rod 47 to be advanced rapidly through its bearings and to extend into a chamber 40 in the carrier 41 so as to eject therefrom the feed tube 37 therein. The feed tube 37 is thus transferred from the carrier 41 to the plunger $g$ whereby it is to be introduced into the air tube $a$ and in order that it may be retained in the plunger $g$ during such introduction said plunger is formed with a longitudinal web 59 in which is a chamber 60 adapted to receive a feed tube 37. As shown in Figures 7 to 11 this chamber 60 is enlarged at its lower end to accommodate that part of the feed tube 37 which is itself enlarged by the head of the stud therein and communicates with a forwardly opening slot 61 in the web 59 and in said slot 61 is secured one end of a curved spring 62 adapted lightly to press against the rear wall of the slot 61 the feed tube 37 which is forced therebetween. This feed tube is then introduced into the air tube $a$ when the plunger $g$ is advanced to move a rubber disc $n$ into position and during that operation the rod 47 is gradually withdrawn from the chamber 40 in the carrier 41 and angular movement is imparted to the latter so as to bring the succeeding chamber 40 into alignment with the rod 47. For this purpose the block 50 on the rod 47 is furnished with a stud 63 which passes through a slot 64 in a link 65 which is pivotally connected with the arm 43 which actuates the pawl 42, the length of the slot 64 and the arrangement of the parts being such that when the rod 47 is suddenly advanced the stud 63 moves idly through the slot 64 until it reaches the upper end thereof whereupon it raises said link and so turns the arm 43 about its pivot 45 and draws back the pawl 42 into engagement with the wall of the succeeding chamber 40 (or tooth) of the carrier 41. These positions of the pawl 42, arm 43 and link 65 are retained during the greater part of the retraction of the rod 47, but after the latter is clear of the carrier 41 the stud 63 meets the lower end of the slot 64 and thus causes the link 65 to partake of further retraction of the rod 47 so that the arm 43 is rocked about its pivot 45 and the pawl 42 advances the carrier 41 angularly to bring the succeeding chamber 40 into position, and so on. It is desirable that a stop 66 be provided to limit the movement of the arm 43 and to prevent the sudden shock from carrying back the pawl 42 a distance greater than is sufficient angularly to advance the carrier 41 by one chamber 40.

The partially vulcanized valveless rubber feed tube 37 is thus introduced into the air tube $a$ by the plunger $g$ the movement of which at the ends of its stroke is so slow that the introduced feed tube 37 is virtually held in position just beyond the end of the outer tube $c$ of the die as shown in Figure 4 until such time as the air tube $a$ has been punctured to give passage to the neck 38 of the head portion of the stud, the wall of the air tube $a$ has been pushed towards the head of the stud to force it over said neck 38, the base of the stud has been located on said neck, and said neck 38 has been expanded in, riveted over or otherwise secured to said base so as to mount the feed tube 37 upon the air tube $a$, the shoulder in the chamber 60 in the plunger $g$, constituting, during these operations, an abutment or anvil for the operative elements of the stud-base-securing-means, hereinafter described, after which operations the plunger $g$ is retracted, the feed tube 37 slipping from between the spring 62 and the wall of the chamber 60, the forwardly opening slot 61 permitting the plunger $g$ to clear said feed tube. The plunger $g$ then returns to its initial position ready to receive another feed tube, and to advance another disc $n$ and so on in succession.

The stud-base-securing-means are situated radially beneath the gap $h$ in the projecting end of the outer tube $c$ of the die and a supply of stud bases to be fed to said stud-base-securing-means is introduced edge-on into a flat hopper 67, (Figure 15) from which said stud bases roll or slide, in succession and still edge-on, down a flat inclined chute 68 to a recess 69 in a feed quadrant 70, carried by an arm 71 pivoted at 72 on a lug 73 secured to the outer tube $c$ of the die. The recess 69 opens at one side of the quadrant 70 and the latter is so arranged edge-on to the chute 68 that in one position of the quadrant 70 the recess 69 constitutes a pocket at the end of said chute of sufficient size to accommodate one stud base. The recess is virtually closed at its top by a cross strap 74, whilst at the bottom of its leading edge (that is leading in the direction in which it is advanced to feed a stud base) it is furnished with an inwardly projecting pin 75 and below the bottom of its trailing edge with a removable ledge constituted by part of a plate 76 held to the underside of the quadrant 70 by pins 77 passing through a slot 78 in said plate 76 so that the latter may be slidden under the quadrant 70 against the action of a spring 79 to eliminate the ledge. The plate 76 is furnished with a nose 80 projecting beyond the leading end of the quadrant 70 for a purpose which will appear hereinafter.

The arm 71 carries at its free end a cross bar 81 to one end of which is connected the trailing end of the quadrant 70 and to the other end of which is pivotally connected the upper end of a rod 82 the lower end of which is connected with a spring influenced rocking arm 83 an antifriction roller 84 on which bears against a cam 85 on the shaft $t$, the arrangement being such that the quadrant 70 is caused to oscillate forwards and backwards about its pivot 72, whilst the shape of the cam 85 causes the rate of angular movement of the quadrant 70 to increase towards the end of its forward or feeding stroke and then gradually decrease on its return stroke. In this manner stud bases are fed in succession from the hopper 67 through the chute 68 to the recess 69 in the quadrant 70 and fed thereby into position in axial alignment with the neck 38 of the stud in the feed tube 37 which has been introduced into the air tube $a$ by the plunger $g$. Just before the end of the forward stroke of the quadrant 70 the nose 80 of the plate 76 strikes against the end of the outer tube $c$ of the die, thus causing the movement of said plate to be arrested whilst the quadrant 70 continues to the end of its stroke. This relative movement of the quadrant 70 and plate 76 eliminates the shoulder beneath the trailing edge of the recess 69 in the quadrant 70 and allows the stud base therein to fall therefrom without, however, losing its almost horizontal orientation.

Almost vertically beneath the position at which the stud base is thus released is situated a vertically movable plunger 86 for lifting up said stud base through the gap $h$ and against the outer wall of the air tube $a$, for puncturing said air tube $a$, for centering the base relatively to the neck 38 of the stud, and for expanding said neck 38 so as to secure the base and head together. This plunger 86 is furnished with a peripherally grooved collar 87 into which projects a pin 88 extending laterally from an arm 89 which is mounted on a shaft 90 carried in bearings in the bracket 49, and on said shaft 90 is mounted a second arm 91 with which is pivotally connected the upper end of a rod 92 the lower end of which is connected with a spring influenced rocking bar 93 furnished with an antifriction roller 94 adapted to bear against a cam 95 mounted on the shaft $t$. This arrangement and the shape of the cam 95 are such that the rocking bar 93 is raised and the plunger 86 retracted rapidly during a small angular movement of said cam 95 and said parts are held in those positions for the greater part of one revolution of said cam; then the rocking bar 93 is allowed to descend suddenly causing the plunger 86 to be forced upwards very suddenly under the action of the spring which influences the rocking bar 93. In addition to the spring such as $v$ Figure 3 which pulls the rocking bar 93 downwards an additional spring 96 is provided which is suddenly stressed when the rocking bar 93 descends and causes it, and therefore the plunger 86 to rebound slightly for a purpose which will be explained hereinafter. The rise and partial fall of the plunger 86 is therefore practically instantaneous. The stud-base securing plunger 86 has a head 97 adjustably screwed thereon to compensate for wear and for like purposes, said head 97 having a stem 98 projecting upwardly therefrom whilst a collar 99 of inverted L-section is screwed on the head 97 so as to surround the stem 98. Slidably disposed in the annular space between the stem 98 and the collar 99 is an annular die plate 100 pressed by a coiled spring 101 so that its circumferential margin is overlapped by the inturned limb of the L-section collar 99 thereby limiting its upward movement, whilst fitted into the upper end of the stem 98 of the plunger head is an upwardly extending tapered spike 102 which projects co-axially through the annular die plate 100. The stud-base-feeding-means and the stud-base-securing-means are actuated so that the following sequence of operations takes place:—

A stud base is fed from the hopper 67 to the recess 69 of the quadrant 70 and carried and released as above set forth, over the head 97 of the stud-base-securing-plunger 86, the tapered spike 102 centering the stud base on the annular die plate 100, the quadrant 70 is retracted so that its recessed end is clear of the stud-base-securing-plunger 86 and said plunger is then raised and lowered practically instantaneously, as above set forth. The tapered spike 102 perforates the wall of the air tube $a$ and enters the neck 38 of the stud, the stud base is pressed up against the wall of the air tube $a$ and raises said wall against that part of the partially vulcanized valveless rubber feed tube 37 which underlies the bottom of the head of the stud, the wall of the air tube $a$ being forced over the neck 38 of the stud head and the stud base being centred on said neck 38 and the bottom of said neck 38 is then expanded in the stud base by the further advance of the tapered spike 102 so as to secure together the head and base of the stud, the spring 101 between the annular die plate 100 and the shoulder at the base of the stem 98 of the head 97 of the stud-base-securing-plunger 86 serving as a buffer to prevent the upward movement from forcing the feed tube 37 against the shoulder in the chamber 60 in the plunger $g$ so violently as to nip it between said shoulder and the head of the stud and cut through it, the die plate 100 yielding whilst the spike 102 advances to expand the neck 38 of the stud in the base. The stress imparted to the spring 96 at end of the advance of the stud-base-securing-plunger causes the latter to rebound instantaneously thus withdrawing the tapered spike 102 from the expanded neck 38 of the stud. Owing to the fact that the rubber is forced forward for the formation of the air tube *a* in the die very slowly as compared with the practically instantaneous action of the stud-base-securing-means, the fact that these means puncture the air tube *a* and secure the stud in position whilst the air tube *a* is moving forwardly, is of no consequence, as the raw rubber yields sufficiently to enable this substantially instantaneous action to take place without damaging said rubber, which springs back as soon as the stud-base-securing-plunger 86 is retracted.

It is to be understood that the various operative groups constituting the whole apparatus are so coordinated that as the raw rubber air tube *a* is extruded, a raw rubber diaphragm is formed therein, and a partially vulcanized valveless rubber feed tube is mounted therein and so on in succession to produce the required length of multicellular air tube having a series of sections or compartments into each of which extends a valveless rubber feed tube at the junction of which with the air tube is situated a stud. When the required length of air tube has been produced it is cut off, its end united, a strip of raw rubber secured thereto by its edges to form the common feed passage, an inflation valve is placed in position and the tube is vulcanized.

If desired, means somewhat similar to those for feeding the raw rubber discs *n* or to those for feeding the stud bases to the stud-base-securing-plunger 86, may be provided for feeding tablets of a gas producing substance such as ammonia in succession to the passage 34, for introduction into the sections or compartments of the air tube *a* being extruded, for use during the subsequent vulcanizing operation as will be well understood.

Instead of cutting off sufficient length of extruded tube to constitute one air tube, the tube, as it is extruded, may be wound helically on a drum and the necessary length cut off as and when required.

As the method of manufacture is a continuous one and as the greater part is carried out by machinery, the air tubes can be produced very rapidly and economically.

I claim:—

1. The improved method of manufacturing a multi-cellular air tube for a pneumatic tire which consists in extruding raw rubber and successively forcing into position, axially of the tube being manufactured, a series of raw rubber discs.

2. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube.

3. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, the inner tube of the die being shorter than the outer tube and the stroke of the plunger being such as to push a raw rubber disc out of said inner tube, so that when said disc leaves said inner tube, its periphery will make contact and join with the inner periphery of the extruded air tube before the latter leaves the outer tube and is free to expand.

4. In an apparatus for the manufacture of multi-cellular air tubes for pneumatic tires, the combination of a die having the form of a toroidal cylinder and constituted by two co-axial tubes having an annular space therebetween and adapted for the feeding thereinto and therethrough of raw rubber, a plunger adapted to be reciprocated in the inner tube in an arcuate path, and means for feeding raw rubber discs to said inner tube in advance of the plunger and in a plane substantially normal to the direction of length of said tube.

5. In an apparatus for the manufacture of multi-cellular air tubes for pneumatic tires, the combination of a die having the form of a toroidal cylinder and constituted by two co-axial tubes having an annular space therebetween and adapted for the feeding thereinto and therethrough of raw rubber, the inner tube of the die being shorter than the outer tube, a plunger adapted to be reciprocated in the inner tube in an arcuate path, and means for feeding raw rubber discs to said inner tube in advance of the plunger and in a plane substantially normal to the direction of length of said tube, the stroke of the plunger being such as to push a raw rubber disc out of said inner tube, so that when said disc leaves said inner tube, its periphery will make contact and join with the inner periphery of the extruded air tube before the latter leaves the outer tube and is free to expand.

6. In an apparatus for the manufacture of multi-cellular air tubes for pneumatic tires, the combination of a die having a slot and constituted by two co-axial tubes having an annular space therebetween and adapted for the feeding thereinto and therethrough of raw rubber, a plunger adapted to be reciprocated in the inner tube and means for feeding raw rubber discs in succession to said slot and through the same to said inner tube in advance of the plunger and in a plane substantially normal to the direction of length of said tube.

7. In an apparatus for the manufacture of multi-cellular air tubes for pneumatic tires, the combination of a die having a slot and constituted by two co-axial tubes having an annular space therebetween and adapted for the feeding thereinto and therethrough of raw rubber, a plunger adapted to be reciprocated in the inner tube and means for feeding raw rubber discs in succession to said slot and through the same to said inner tube in advance of the plunger and in a plane substantially normal to the direction of length of said tube, the inner tube being shorter than the outer tube and the stroke of the plunger being such as to push a raw rubber disc out of said inner tube, so that when said disc leaves said inner tube, its periphery will make contact and join with the inner periphery of the extruded air tube before the latter leaves the outer tube and is free to expand.

8. In an apparatus for the manufacture of multi-cellular air tubes for pneumatic tires, the combination of a die provided with a slot and having the form of a toroidal cylinder, said die being constituted by two co-axial tubes having an annular space therebetween and adapted for the feeding thereinto and therethrough of raw rubber, a plunger adapted to be reciprocated in the inner tube in an arcuate path and means for feeding raw rubber discs in succession to said slot and through the same to said inner tube in advance of the plunger and in a plane substantially normal to the direction of length of said tube.

9. In an apparatus for the manufacture of multi-cellular air tubes for pneumatic tires, the combination of a die provided with a slot and having the form of a toroidal cylinder, said die being constituted by two co-axial tubes having an annular space therebetween and adapted for the feeding thereinto and therethrough of raw rubber, the inner tube of the die being shorter than the outer tube, a plunger adapted to be reciprocated in the inner tube in an arcuate path and means for feeding raw rubber discs in succession to said slot and through the same to said inner tube in advance of the plunger and in a plane substantially normal to the direction of length of said tube, the stroke of the plunger being such as to push a raw rubber disc out of said inner tube, so that when said disc leaves said inner tube, its periphery will make contact and join with the inner periphery of the extruded air tube before the latter leaves the outer tube and is free to expand.

10. In an apparatus for the manufacture of multi-cellular air tubes for pneumatic tires, the combination of a die constituted by two co-axial tubes having an annular space therebetween and adapted for the feeding therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, and means for introducing into each compartment of the air tube a valveless rubber feed tube of the kind hereinbefore set forth.

11. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, and means connected with said plunger for introducing the valveless rubber feed tubes into position within the air tube.

12. The improved method of manufacturing a multi-cellular air tube as claimed in claim 1, consisting further in introducing into each section or compartment a valveless partially vulcanized rubber feed tube with the head portion of a so-called "stud" therein, puncturing the air tube to give passage to the neck portion of said stud, applying the base portion of said stud to said neck and securing it thereto, substantially as set forth.

13. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube and means for introducing into each compartment of the air tube a valveless rubber feed tube of the kind hereinbefore set forth, means for feeding to the feed-tube-introducing means, in succession, valveless rubber feed tubes each with the head portion of a so-called stud previously arranged therein, means for transferring said feed tubes individually from their feeding means to their introducing means, means for feeding into position, in succession, the bases of the studs, means for puncturing the air tube to give passage to the necks of the head portions of the successive studs, means for placing said bases individually upon said necks and for securing them thereto and means co-ordinating the several feeding, introducing and other operative portions of the complete apparatus, substantially as set forth.

14. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, and means for introducing into each compartment of the air tube a valveless rubber feed tube of the kind hereinbefore set forth, means for feeding to the feed-tube-introducing means, in succession, valveless rubber feed tubes each with the head portion of a so-called stud previously arranged therein, means for transferring said feed tubes individually from their feeding means to their introducing means, means for feeding into position, in succession, the bases of the studs, means for puncturing the air tube to give passage to the necks of the head portions of the successive studs, means for placing said bases individually upon said necks and for securing them thereto and means co-ordinating the several feeding, introducing and other operative portions of the complete apparatus, substantially as set forth, crank driven mechanism and an arcuate lever adapted to reciprocate said plunger in the die, cam operated mechanism adapted to operate the other operative portion of the complete apparatus in co-ordination with said plunger and a shaft common to said crank driven and cam operated mechanisms.

15. In an apparatus for the manufacture of multi-cellular air tubes for pneumatic tires, the combination of a die having a slot and constituted by two co-axial tubes having an annular space therebetween and adapted for the feeding thereinto and therethrough of raw rubber, a plunger adapted to be reciprocated in the inner tube and means for feeding raw rubber discs in succession to said slot and through the same to said inner tube in advance of the plunger and in a plane substantially normal to the direction of length of said tube, said feeding means comprising a flat plunger adapted to be reciprocated beneath a hopper in which the discs are arranged substantially horizontally and one above another, a snail cam adapted gradually to retract and quickly to advance said plunger and a chute leading from the outlet of said hopper to said slot, substantially as set forth.

16. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, and means for introducing into each compartment of the air tube a valveless rubber feed tube of the kind hereinbefore set forth, an annular carrier having a series of radial chambers each adapted to receive a feed tube with the head of a stud therein, said carrier being arranged and adapted to be revolved around an extension of the die, adjacent to the retracted position of the plunger, a rod adapted to be slidden into each radial chamber in succession, so as to push the feed tube out therefrom and into the feed-tube-introducing means, a snail cam adapted gradually to retract and quickly to advance said rod and ratchet and pawl mechanism operable during part of the backward travel of said rod adapted angularly to advance said carrier.

17. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, a longitudinal web in said plunger provided with a chamber adapted to receive a feed tube with the head of a stud therein, a forwardly opening slot leading from said chamber and a curved spring adapted lightly to press said feed tube against the wall of the chamber.

18. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, a longitudinal web in said plunger provided with a chamber adapted to receive a feed tube with the head of a stud therein, a forwardly opening slot leading from said chamber, a curved spring adapted lightly to press said feed tube against the wall of the chamber and a shoulder in the chamber of said plunger adapted to constitute an anvil when the stud-base is secured in position.

19. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, and means for introducing into each compartment of the air tube a valveless rubber feed tube of the kind hereinbefore set forth, means for feeding to the feed-tube-introducing means, in succession, valveless rubber feed tubes each with the head portion of a so-called stud previously arranged therein, means for transferring said feed tubes individually from their feeding means to their introducing means, means for feeding into position, in succession, the bases of the studs, stud-base-feeding means comprising a quadrant formed with a recess opening towards one side thereof and adapted to receive a stud base edge on, a permanent support for the stud base at one side of said recess and a removable support at the opposite side, and a cam and link and lever mechanism for oscillating said quadrant, said removable support being adapted to be displaced at one end of the stroke of the quadrant so as to release the stud-base, substantially as set forth.

20. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, and means for introducing into each compartment of the air tube a valveless rubber feed tube of the kind hereinbefore set forth, means for feeding to the feed-tube-introducing means, in succession, valveless rubber feed tubes each with the head portion of a so-called stud previously arranged therein, means for transferring said feed tubes individually from their feeding means to their introducing means, means for feeding into position, in succession, the bases of the studs, a plunger adapted to receive a stud-base and to press it against the outer wall of the air-tube, and a tapered spike on said plunger for puncturing said air-tube, for centering the stud-base and for expanding the neck of the stud.

21. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, and means for introducing into each compartment of the air tube a valveless rubber feed tube of the kind hereinbefore set forth, means for feeding to the feed-tube-introducing means, in succession, valveless rubber feed tubes each with the head portion of a so-called stud previously arranged therein, means for transferring said feed tubes individually from their feeding means to their introducing means, means for feeding into position, in succession, the bases of the studs, a plunger adapted to receive a stud base and to press it against the outer wall of the air-tube, and a tapered spike on said plunger for puncturing said air-tube, for centering the stud-base and for expanding the neck of the stud, a link and lever mechanism connected with the plunger, and a cam for operating said link and lever mechanism to actuate said plunger, said cam being so shaped that said plunger is advanced and retracted very rapidly to and from its operative position.

22. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, and means for introducing into each compartment of the air tube a valveless rubber feed tube of the kind hereinbefore set forth, means for feeding to the feed-tube-introducing means, in succession, valveless rubber feed tubes each with the head portion of a so-called stud previously arranged therein, means for transferring said feed tubes individually from their feeding means to the introducing means, means for feeding into position, in succession, the bases of the studs, a plunger adapted to receive a stud base and to press it against the outer wall of the air-tube, and a tapered spike on said plunger for puncturing said air-tube, for centering the stud-base and for expanding the neck of the stud, a link and lever mechanism connected with the plunger, a cam for operating said link and lever mechanism to actuate said plunger, said cam being so shaped that said plunger is advanced and retracted very rapidly to and from its operative position, a spring connected with that lever of said link and lever mechanism which is acted upon by said cam so as to advance the plunger and a rebound spring connected with said lever substantially as set forth.

23. In an apparatus for the manufacture of multi-cellular air tubes for pneumatic tires, the combination of a die constituted by two co-axial tubes having an annular space therebetween and adapted for the feeding thereinto and therethrough of raw rubber, a plunger adapted to be reciprocated in the inner tube, and means for feeding raw rubber discs to said inner tube in advance of the plunger and in a plane substantially normal to the direction of length of said tube, and means for introducing into each compartment of the air tube a valveless rubber feed tube of the kind hereinbefore set forth, means for feeding to the feed-tube-introducing means, in succession, valveless rubber feed tubes each with the head portion of a so-called stud previously arranged therein, means for transferring said feed tubes individually from their feeding means to their introducing means, means for feeding into position, in succession, the bases of the studs, a plunger adapted to receive a stud-base and to press it against the outer wall of the air-tube, and a tapered spike on said plunger for puncturing said air-tube, for centering the stud-base and for expanding the neck of the stud, and a spring influenced die plate on said plunger adapted to permit the tapered spike to advance to expand the neck of the stud after the stud-base has been pressed into position.

THOMAS BAKER McLEROTH.